(12) United States Patent
Hamlyn et al.

(10) Patent No.: US 7,926,537 B2
(45) Date of Patent: Apr. 19, 2011

(54) APPLICATOR HEAD FOR FIBERS WITH PARTICULAR SYSTEMS FOR CUTTING FIBERS

(75) Inventors: Alexander Hamlyn, Ploemeur (FR); Yvan Hardy, Lorient (FR)

(73) Assignee: Coriolis Composites, Lyons (FR)

( * ) Notice: Subject to any disclaimer, the term of this patent is extended or adjusted under 35 U.S.C. 154(b) by 847 days.

(21) Appl. No.: 11/740,064

(22) Filed: Apr. 25, 2007

(65) Prior Publication Data
US 2008/0216963 A1 Sep. 11, 2008

(30) Foreign Application Priority Data
Mar. 6, 2007 (FR) ..................... 07 01626

(51) Int. Cl.
*B29C 65/00* (2006.01)
*B29C 65/50* (2006.01)
*B32B 37/00* (2006.01)
*B32B 38/04* (2006.01)

(52) U.S. Cl. ........ 156/517; 156/256; 156/257; 156/510; 156/516; 156/523; 156/527

(58) Field of Classification Search ............... 156/156, 156/256, 257, 264, 265, 269, 270, 367, 468, 156/486, 510, 516, 517, 523, 527, 530, 538–541, 156/543, 544; 30/339
See application file for complete search history.

(56) References Cited

U.S. PATENT DOCUMENTS

| | | | |
|---|---|---|---|
| 494,910 A | 4/1893 | Wells | |
| 1,100,829 A | 6/1914 | Joseph | |
| 1,164,303 A | 12/1915 | Nicewarner | |
| 1,301,354 A | 4/1919 | Baird | |
| 3,238,084 A | 3/1966 | Hawkins | |
| 3,265,795 A | 8/1966 | Medney | |
| 3,300,355 A | 1/1967 | Adams | |
| 3,563,122 A * | 2/1971 | De Neui | 83/205 |
| 3,662,821 A | 5/1972 | Saxon | |
| 3,713,572 A | 1/1973 | Goldsworthy et al. | |
| 3,856,052 A | 12/1974 | Feucht | |
| 4,118,814 A | 10/1978 | Holtom | |
| 4,242,160 A | 12/1980 | Pinter et al. | |

(Continued)

FOREIGN PATENT DOCUMENTS
DE 1 922 327 8/1965

(Continued)

OTHER PUBLICATIONS
File History for U.S. Appl. No. 11/666,537, filed Nov. 26, 2008.

(Continued)

*Primary Examiner* — Mark A Osele
*Assistant Examiner* — Christopher C Caillouet
(74) *Attorney, Agent, or Firm* — Patterson Thuente Christensen Pedersen, P.A.

(57) ABSTRACT

The present invention relates to a head for applying fibers in order to make components of composite materials, intended to be mounted at the end of a displacement system for applying to a surface a wide strip formed of a number of fibers. The head comprises an application roller for applying fibers in the form of a strip, means for guiding fibers on said roller, and cutting means including blades activated by activation systems between a rest position and an active cutting position so as to cut the fibers upstream of the application roller. Said blades and associated activation systems are all placed on the side of the roller relative to said fibers.

16 Claims, 7 Drawing Sheets

U.S. PATENT DOCUMENTS

| | | |
|---|---|---|
| 4,351,688 A | 9/1982 | Weiss et al. |
| 4,488,466 A | 12/1984 | Jones |
| 4,562,033 A | 12/1985 | Johnson et al. |
| 4,569,716 A | 2/1986 | Pugh |
| 4,574,029 A | 3/1986 | Murray |
| 4,699,031 A | 10/1987 | D'Angelo et al. |
| 4,717,330 A | 1/1988 | Sarh |
| 4,735,672 A | 4/1988 | Blad |
| 4,849,150 A | 7/1989 | Kittaka et al. |
| 4,976,012 A | 12/1990 | McConnell |
| 4,990,213 A | 2/1991 | Brown et al. |
| 4,992,133 A | 2/1991 | Border |
| 4,997,513 A | 3/1991 | Lengen et al. |
| 5,078,592 A | 1/1992 | Grimshaw et al. |
| 5,087,187 A | 2/1992 | Simkulak et al. |
| 5,110,395 A * | 5/1992 | Vaniglia ............... 156/353 |
| 5,290,389 A * | 3/1994 | Shupe et al. ............ 156/425 |
| 5,700,347 A | 12/1997 | McCowin |
| 6,026,883 A | 2/2000 | Hegerhorst et al. |
| 6,073,670 A | 6/2000 | Koury |
| 6,256,889 B1 | 7/2001 | Zuro |
| 6,458,309 B1 | 10/2002 | Allen et al. |
| 6,490,990 B1 | 12/2002 | Hamlyn et al. |
| 6,605,171 B1 | 8/2003 | Debalme et al. |
| 7,048,024 B2 | 5/2006 | Clark et al. |
| 2002/0014715 A1 | 2/2002 | Wirth et al. |
| 2002/0090408 A1 | 7/2002 | Dahl et al. |
| 2002/0152860 A1 | 10/2002 | Machamer |
| 2003/0118681 A1 | 6/2003 | Dahl et al. |
| 2004/0031879 A1 | 2/2004 | Kay et al. |
| 2005/0023414 A1 | 2/2005 | Braun |
| 2005/0037195 A1 | 2/2005 | Warek |
| 2005/0039844 A1 | 2/2005 | Engwall et al. |
| 2005/0061422 A1 | 3/2005 | Martin |
| 2006/0162143 A1 | 7/2006 | Nelson et al. |
| 2006/0169118 A1 | 8/2006 | Morehead |
| 2006/0180264 A1 | 8/2006 | Kisch et al. |
| 2006/0231682 A1 | 10/2006 | Sarh |
| 2007/0044919 A1 | 3/2007 | Hoffmann |
| 2008/0093026 A1 | 4/2008 | Naumann |
| 2008/0105785 A1 | 5/2008 | Griess et al. |
| 2008/0157437 A1 | 7/2008 | Nelson et al. |
| 2008/0196825 A1 | 8/2008 | Hamlyn |
| 2008/0202691 A1 | 8/2008 | Hamlyn et al. |
| 2008/0216961 A1 | 9/2008 | Hamlyn et al. |
| 2009/0229760 A1 | 9/2009 | Hamlyn et al. |
| 2009/0311506 A1 | 12/2009 | Herbeck et al. |
| 2010/0252183 A1 | 10/2010 | Munaux |

FOREIGN PATENT DOCUMENTS

| | | |
|---|---|---|
| DE | 37 43 485 A1 | 7/1989 |
| DE | 10 2007 009 124 A1 | 8/2008 |
| EP | 0 216 695 A1 | 4/1987 |
| EP | 0 241 251 A1 | 10/1987 |
| EP | 0 557 158 A1 | 8/1993 |
| EP | 0 626 252 B1 | 11/1994 |
| EP | 0 753 394 A2 | 1/1997 |
| EP | 0 773 099 A1 | 5/1997 |
| EP | 1 001 066 A2 | 5/2000 |
| EP | 1 177 871 A2 | 2/2002 |
| EP | 1 342 555 A1 | 9/2003 |
| EP | 1 757 552 A2 | 2/2007 |
| FR | 1 590 718 | 5/1970 |
| FR | 2 050 498 | 4/1971 |
| FR | 2 254 428 | 7/1975 |
| FR | 2 624 786 A1 | 6/1989 |
| FR | 2 686 080 A1 | 7/1993 |
| FR | 2 721 548 A1 | 12/1995 |
| FR | 2 784 930 A1 | 4/2000 |
| FR | 2 865 156 A1 | 7/2005 |
| FR | 2 882 681 A1 | 9/2006 |
| FR | 2 913 365 A1 | 9/2008 |
| GB | 2 268 705 A | 1/1994 |
| GB | 2 270 672 A | 3/1994 |
| GB | 2 292 365 A | 2/1996 |
| JP | 01 281247 | 11/1989 |
| JP | 2005329593 | 12/2005 |
| WO | WO 95/20104 | 7/1995 |
| WO | WO 02/070232 A1 | 9/2002 |
| WO | WO 03/035380 A1 | 5/2003 |
| WO | WO 2006/060270 A1 | 6/2006 |
| WO | WO 2006/092514 A2 | 9/2006 |
| WO | WO 2008/149004 A1 | 12/2008 |
| WO | WO 2010/049424 A1 | 5/2010 |

OTHER PUBLICATIONS

File History for U.S. Appl. No. 11/740,055, filed Apr. 25, 2007.
File History for U.S. Appl. No. 11/740,057, filed Apr. 25, 2007.
File History for U.S. Appl. No. 11/740,060, filed Apr. 25, 2007.
Transaction History for U.S. Patent No. 6,490,990, Issued Dec. 10, 2002.
French Search Report dated Apr. 13, 2010 for French Application No. 09 54963.
French Search Report dated Apr. 15, 2010 for French Application No. 09 54964.
File History for U.S. Appl. No. 12/434,253, filed May 1, 2009.
File History for U.S. Appl. No. 12/628,449, filed Dec. 1, 2009.
File History for U.S. Appl. No. 12/628,460, filed Dec. 1, 2009.
Application and File History for U.S. Appl. No. 11/666,537, filed Nov. 26, 2008, inventor Hamlyn at www.uspto.gov.
Application and File History for U.S. Appl. No. 11/740,055, filed Apr. 25, 2007 inventor Hamlyn at www.uspto.gov.
Application and File History for U.S. Appl. No. 11/740,057, filed Apr. 25, 2007, inventor Hamlyn at www.uspto.gov.
Application and File History for U.S. Appl. No. 11/740,060 filed Apr. 25, 2007, inventor Hamlyn, at www.uspto.gov.
Application and File History for U.S. Appl. No. 12/434,253, filed May 1, 2009, inventor Munaux at www.uspto.gov.
Application and File History for U.S. Appl. No. 12/628,449, filed Dec. 1, 2009 inventor Hamlyn, at www.uspto.gov.
Application and File History for U.S. Appl. No. 12/628,460, filed Dec. 1, 2009, inventor Hamlyn at www.uspto.gov.
International Search Report for International Application No. PCT/EP2010/054377 dated Jul. 2, 2010.

* cited by examiner

APPLICATOR HEAD FOR FIBERS WITH PARTICULAR SYSTEMS FOR CUTTING FIBERS

RELATED APPLICATION

The present application claims priority to French Application No. 0701626 filed Mar. 6, 2007, which is incorporated herein in its entirety by reference.

FIELD OF THE INVENTION

The present invention relates to a head for applying fibers in order to make components of composite materials, and in particular a fiber application head with special fiber cutting systems.

BACKGROUND OF THE INVENTION

Fiber application machines, commonly known as fiber placement machines, are known, for the application to a male or female mold of a wide strip formed of a number of flat fibers, of the ribbon type, impregnated with resin, particularly carbon fibers impregnated with a thermosetting or thermoplastic resin. These machines include a system for the displacement of a fiber application head, fiber storage means, and means for conveying fibers from said storage means to the application head.

Fiber placement heads traditionally include, as described in particular in international application WO2006092514, an application roller intended to come into contact against the mold in order to apply the strip, means for guiding the fibers on said application roller, cutting means in order to cut each fiber individually upstream of the roller, and rerouting means upstream of the cutting means so as to reroute each fiber that has just been cut in order to be able at any time to stop and resume the application of a strip, and to choose the width of the strip. The guide means include two systems of ducts or pulleys arranged in staggered rows along two guide planes that grow closer to each other from downstream to upstream so as to guide two layers or bundles of fibers separately towards the roller. For each fiber, the cutting means include a plane blade activated by a pneumatic jack and placed facing a fixed counter tool, and the rerouting means include kicking rollers activated by jacks and placed facing drive rollers. The blades and the kicking rollers of a first layer, and their associated activation jacks, are placed on the roller side, in other words downstream from the fibers relative to the forward movement of the head in use, whereas the blades and the kicking rollers of the other layer, and their associated activation jacks, are placed upstream of the fibers.

The upstream activation jacks must be placed high enough up, relative to the application roller, for the head to be able to be used on different concave surfaces, and particularly with low angles of attack between the laying surface and the strip of fibers emerging from the guide means. The fibers are cut substantially at the same distance from the roller for the two layers so that the handling of all the activation jacks can be simplified, thereby optimising the accuracy and reliability of the head. The downstream jacks are therefore positioned as high as the upstream jacks. This arrangement of the activation jacks restricts the chances of optimising the compactness of the head, and also restricts the accuracy with which the head can be rerouted, so as to obtain, for example, a strip start with fiber cutting edges as aligned as possible.

To stop the fibers from moving, blocking means are provided to block individually each fiber that has just been cut. These blocking means are placed conventionally upstream of the rerouting means and include their own activation jacks. Apart from space requirement problems, these new activation jacks are tricky to control. They require a complex and accurate control system so as to guarantee the blocking of each fiber that has just been cut.

SUMMARY OF THE INVENTION

The purpose of the present invention is to offer a solution that aims to overcome at least one of the aforementioned drawbacks, thereby in particular optimising the compactness of the fiber placement heads while guaranteeing good reliability in cutting, rerouting and/or blocking the fibers.

To this end, the purpose of the present invention is a fiber application head, intended to be mounted at the end of a displacement system in order to apply to a surface a wide strip formed of a number of fibers, including:
  an application roller for applying the fibers in the form of a strip,
  means for guiding fibers on said roller, and
  cutting means able to cut the fibers upstream of the application roller relative to the direction of forward movement of the fibers, said cutting means including blades activated by activation systems between a rest position and an active cutting position,
wherein said blades and associated activation systems are all placed on the side of the roller relative to said fibers, such that the blades are placed facing the surface of the fibers coming against the roller.

According to the invention, the blades with their associated activation systems, such as pneumatic jacks, are all placed on the same side, on the opposite side from the surfaces of the fibers coming against the processing surface. This arrangement of the cutting means allows fibers to be cut as close as possible to the roller, thereby limiting the amount of slack when rerouting the fibers, while at the same time providing low angles of attack between the processing surface and the strip of fibers emerging from the guide means.

According to one embodiment, the guide means include first and second guide means arranged in staggered rows along two guide planes that grow closer to each other from downstream to upstream in order to guide the fibers towards the roller in the form of two layers of fibers, and in that the cutting means include first cutting means, the blades of which are able to cut individually the fibers of the first layer guided by the first guide means, and second cutting means the blades of which are able to cut individually the fibers of the second layer guided by the second guide means, while passing between the first guide means.

According to one particular embodiment, the blades of the first cutting means and the blades of the second cutting means are arranged in staggered rows along two planes inclined one relative to the other by an angle substantially equating to the angle between the two guide planes, so as to cut the fibers of the two layers substantially perpendicularly, the second cutting means being placed over the first cutting means relative to the roller.

According to another embodiment, the guide means include first channels and second channels intended respectively to receive individually the fibers of the first and of the second layers, said first channels are formed at the assembly interface between a first external plate and a central plate, and said second channels are formed at the assembly interface between said central plate and a second external plate, the blades of the first cutting means passing through the first external plate via at least one slot emerging on the first channels, and the blades of the second cutting means passing through the first plate and the central plate, via at least one slot in said central plate emerging on the second channels.

According to another embodiment, the cutting means include counter tools arranged perpendicular to the guide channels, facing the cutting edges of the blades, and against which the blades are stopped in the cutting position, the counter tools of the first cutting means being formed by a bar of an elastomer material housed in a housing in the central plate, and the counter tools of the second cutting means being formed by a bar of an elastomer material housed in a housing in the second external plate.

According to one embodiment, the head additionally includes fiber rerouting means placed upstream of the cutting means, said rerouting means including kicking rollers activated by activation systems between a rest position and an active position so as to flatten the fibers against at least one drive roller, the kicking rollers and their associated activation systems being placed on the side of the roller relative to the fibers.

The rerouting means include first rerouting means comprising a first drive roller, mounted on the central plate, perpendicularly and tangentially to the first guide channels, and kicking rollers activated by activation systems between a rest position and an active position so as to flatten the fibers of the first layer individually against said first drive roller, and second rerouting means placed upstream of the first rerouting means relative to the direction of forward movement of the fibers in the guide channels, comprising a second drive roller, mounted on the second external plate, perpendicularly and tangentially to the second guide channels, and kicking rollers activated between a rest position and an active position by activation systems extending between the fibers of the first layer so as to flatten the fibers of the second layer individually against said second drive roller, the two rollers being driven in rotation preferably by a common motor by means of a belt.

According to one embodiment, the head includes a support deck by which said head is intended to be joined to a displacement system, said cutting means, said guide means and said application roller, and any rerouting means, form a module, said module being able to be joined by quick-action locking means to the end of the rod of at least one compaction jack mounted on said support deck. The module includes for example two support flanges connected to each other by cross-pieces, and between which are mounted the application roller, the guide means and the cutting means. The positioning on the same side of the layers of the rerouting means and cutting means, and any blocking means, allows the guide means to be easily dismantled thereby affording easy access to the blades and kicking rollers.

The head includes a quick-action pneumatic and/or electrical connection system that allows the module's activation systems to be connected automatically when it is assembled on the deck. All activation systems of the pneumatic jack type will for example be connected to channels of a first pneumatic connection plate of the module, which are then connected in a sealed way with the channels of a second connection plate of the deck when assembling the module, these latter channels being connected to pneumatic directional control valves carried by the deck.

The head additionally includes a heat regulation system including cooling means able to cool the second external plate so as to cool by conduction all the, preferably metal, guide plates, said cooling means including for example means for directing a flow of fresh air onto the second external plate, and/or preferably at least one thermoelectric module brought against the second external plate.

According to one embodiment, the cutting means include a jack type activation system for each blade.

The head additionally includes blocking means placed upstream of the cutting means, on the side of the application roller, able to block the fibers that have just been cut, said blocking means including blocking studs activated by activation systems between a rest position and an active blocking position, said blocking studs and said blades being to advantage activated between their rest position and their active position by common activation systems, said activation systems being able, for each fiber to be cut and to be blocked, to displace a blade and a blocking stud in order to cut and block the fiber, preferably in order to cut and then block the fiber. The use of the same activation systems for cutting and blocking the fibers allows the number of activation systems to be reduced thereby securing a more compact head, simplifying the control of the activation systems, making fiber blocking reliable, obtaining greater accuracy in blocking fibers and therefore greater accuracy in rerouting the cut fibers to the application roller. Preferably, the fiber is cut then blocked, although fully simultaneous cutting and blocking is conceivable. According to one embodiment, said activation systems include a jack for each fiber, preferably a pneumatic one, carrying at the end of its rod a stud and a plane blade for cutting and blocking a fiber individually, the cutting edge preferably projecting slightly relative to the support surface of the blocking stud so that the fiber can be cut and then blocked. The blade may be mounted by its proximal part in a first longitudinal housing in the jack rod, the rod being fitted with a blade blocking system including an activation pin mounted to slide in a second longitudinal housing in the rod and a blocking ball mounted in a transverse bore connecting the two housings, said activation pin being acted upon resiliently by resilient means in a rest position in which said pin holds said blocking ball at least partially engaged in the first housing so as to block the blade axially, in particular in a recess or opening of the blade so as to block it in its first housing, and being able to be displaced from the outside by means of a tool to an unblocked position in which the ball is able to engage partially in the second housing in order to unblock the blade.

The stud is mounted by its proximal part in said second housing, said stud including a longitudinal channel allowing the pin mounted between the stud and the bottom of the housing to be displaced by means of tool inserted into said channel. The blades can thus be easily dismantled, through the end of the jack rods, without needing to dismantle the jacks. The blocking system is centered in accordance with the stud and activated through this stud, this arrangement enabling a blocking system to be integrated without increasing the diameter of the jack rod.

According to one embodiment, the blocking means include blocking counter tools placed facing the support surfaces of the studs and against which the studs are stopped in the active blocking position, said counter tools including to advantage two rigid bars housed in a housing in the central plate and in a housing in the second external plate respectively, perpendicularly to the guide channels.

BRIEF DESCRIPTION OF THE DRAWINGS

The invention will be better understood, and other purposes, details, characteristics and advantages will emerge more clearly in the course of the following detailed explanatory description of one particular currently preferred embodiment of the invention, with reference to appended drawings in which.

DETAILED DESCRIPTION OF THE DRAWINGS

Figure 1:
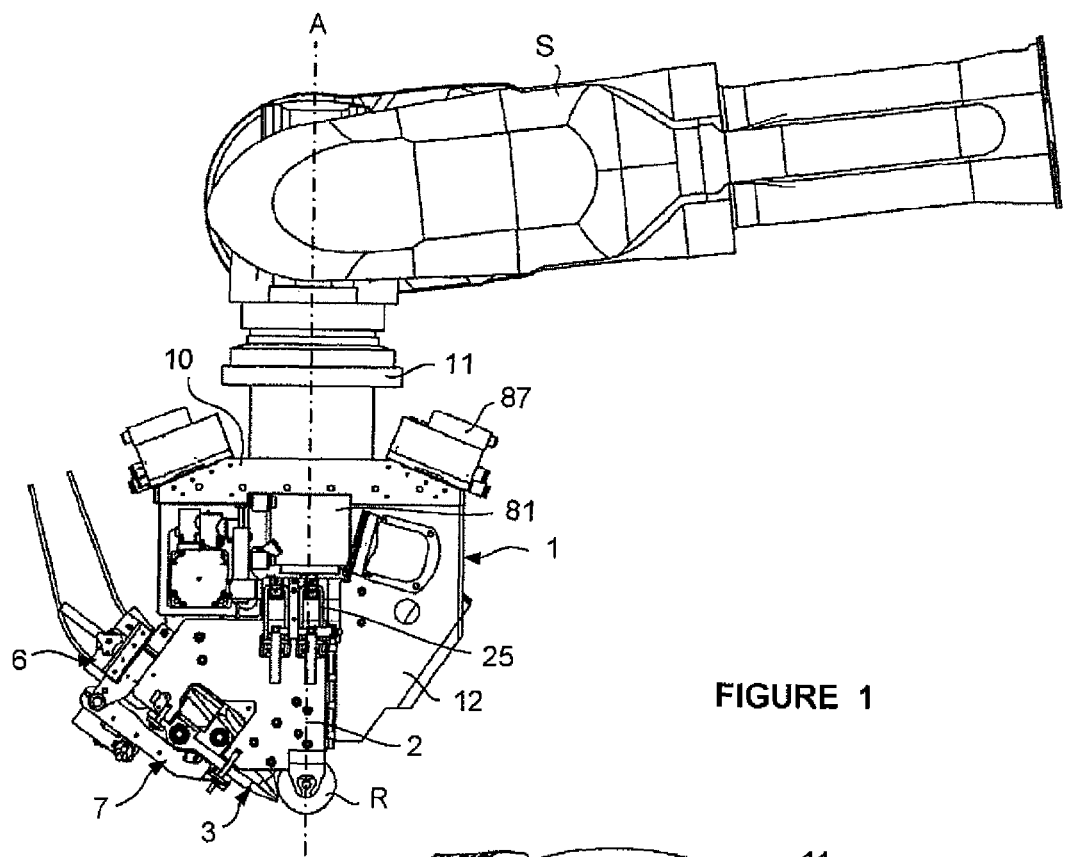
FIG. 1 shows a diagrammatic view from the side of an application head according to the invention joined to the wrist of a robot.
Figure 2:
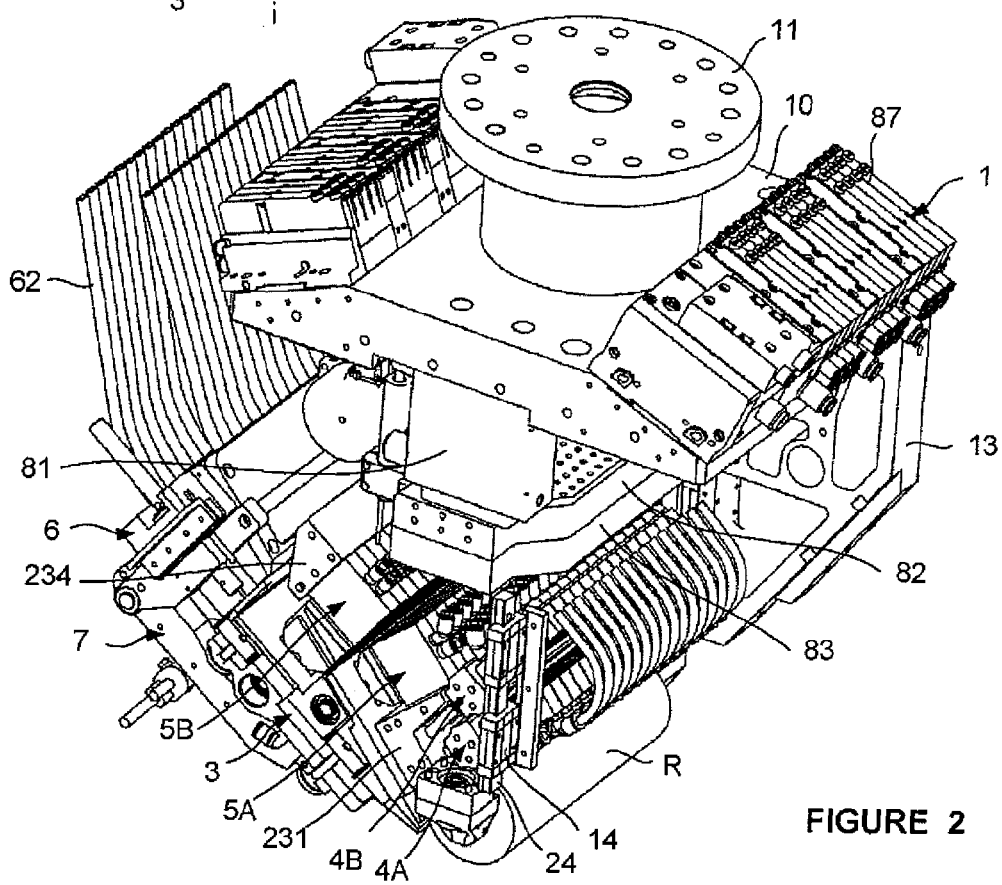
FIG. 2 shows a perspective view of the head in FIG. 1, with some support elements of the head removed so that the inside of the module can be displayed more clearly.

With reference to FIGS. 1 to 6, the fiber placement head 1 includes a support deck 10 fitted in the upper part with a flange 11 for anchoring it, along an assembly axis A, to a displacement system S, in particular to the end wrist of a multi-articulated arm of the 6 axis robot type.

The deck carries in a removable way in its lower part a module 2 including an application roller R, a guide system 3 allowing the fibers to be guided towards the roller in two bundles or layers of fibers along two guide planes P1, P2, cutting and blocking systems 4A, 4B to cut and block each fiber individually and rerouting systems 5A, 5B to reroute individually each fiber that has just been cut.

Figure 4:
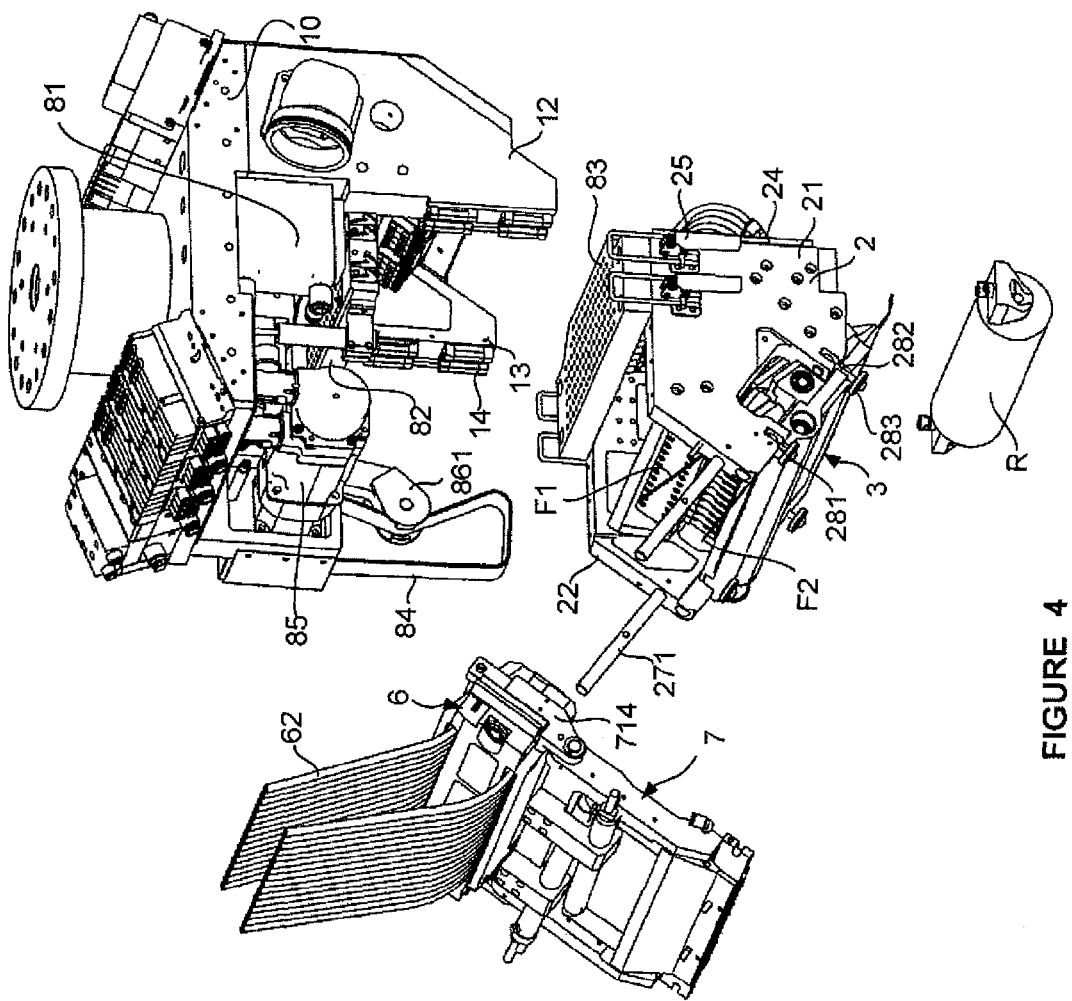
FIG. 4 is an exploded perspective view of the head in FIG. 1 showing the different components of the head which can be easily dismantled.
Figure 3:
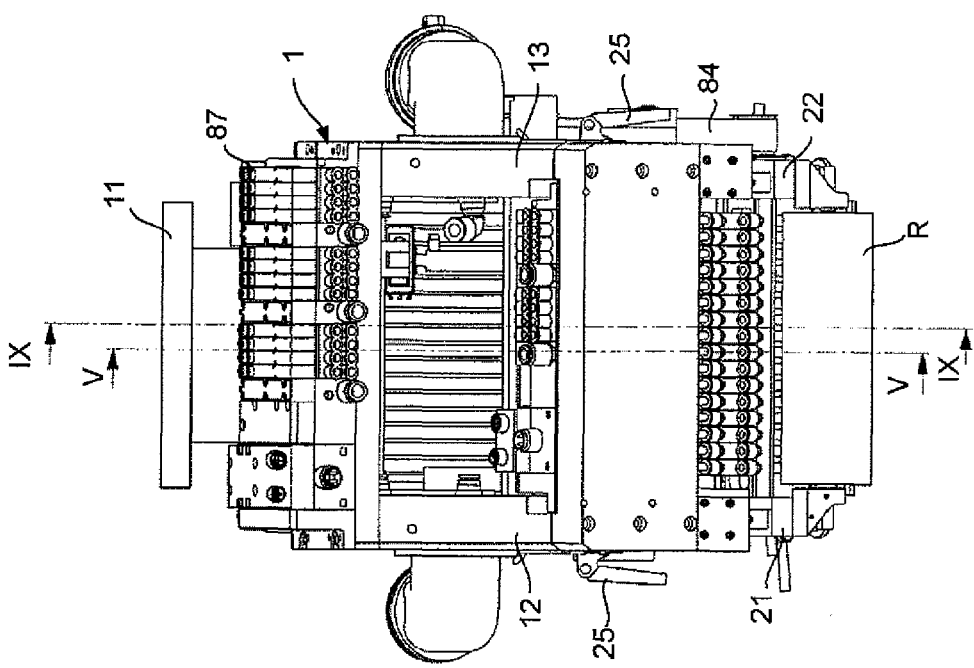
FIG. 3 is a front view of the application head in FIG. 1.
Figure 5:
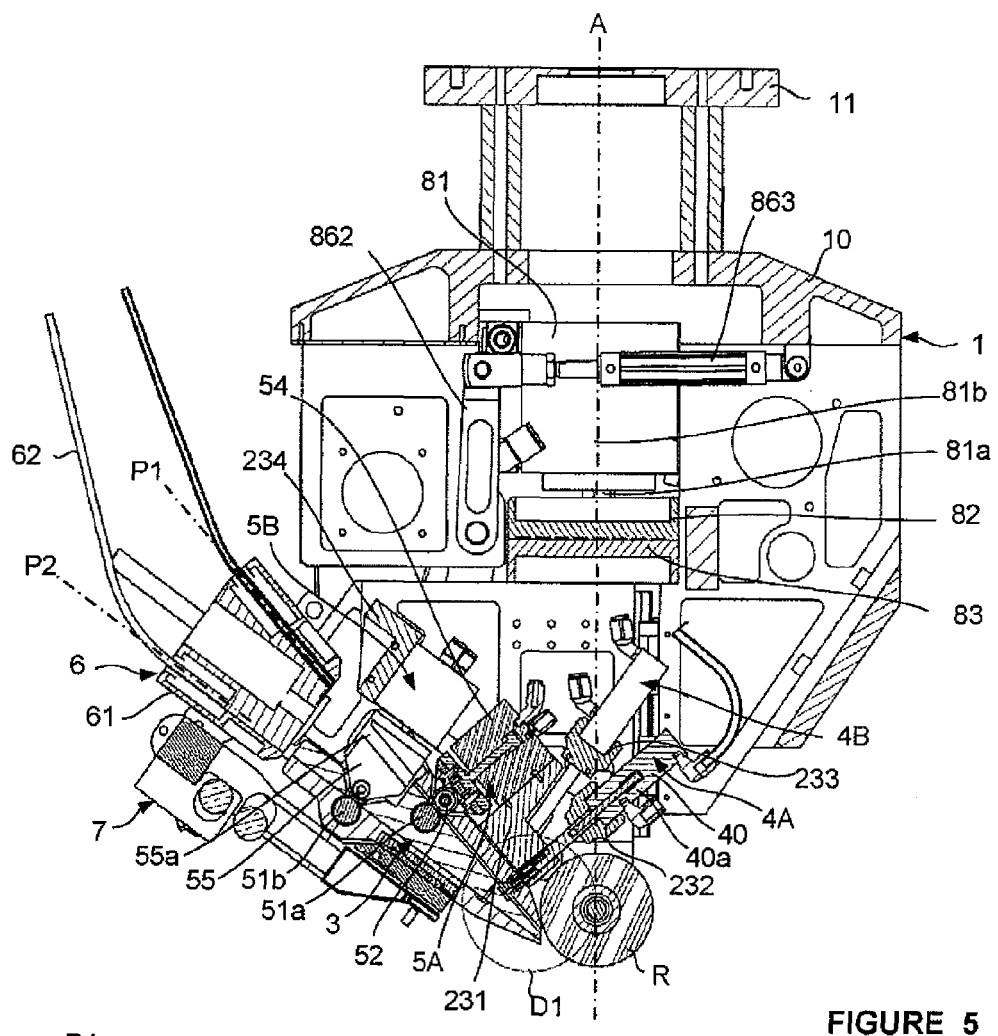
FIG. 5 is a cross-section view of the head along the plane V-V in FIG. 3, showing the guide path for a fiber of the first layer.

According to FIGS. 4 and 5, the module includes two flanges 21, 22, connected to each other by cross-pieces 231 to 234, and between them are mounted the roller R, the guide system 3, the cutting and guide systems 4A and 4B, and the rerouting systems 5A and 5B. The rear edges of the flanges are fitted with vertical rails 24 able to slide in complimentary sliders 14 mounted on the front edges of two vertical support plates 12, 13, which are integral with the deck and which extend downwards from the lower surface of the deck. The module is joined to the shafts of two compaction jacks integral with the support deck. The compaction jacks 81 are joined by their body 81b to the lower surface of the deck. A first so-called pneumatic connection plate 82, is joined to the rods 81a of the compaction jacks 81. A second pneumatic connection plate 83 is mounted on the outer edges of the two flanges 21, 22. In order to assemble it, the module 2 is displaced vertically upwards making the rails 24 slide in the sliders 14, until the pneumatic connection plates 82, 83 are brought flat one against the other. The module is joined to the plate using quick-action blocking means 25, such as toggle lever bolts. The connection plates have a plurality of vertical channels which come into position facing one another, in a sealed way, when the module is assembled in order to provide the pneumatic connection between the different systems of the module, as described below.

The roller R is mounted in rotation on the lower edges of the flanges, using a quick-action assembly system 26, of the quarter turn connector type, with its axis of rotation placed perpendicularly to the assembly axis A and to the compaction jack rods 85a. The axis of rotation of the roller, the assembly axis and the compaction jack rods are placed substantially along one and the same plane.

On this module 2 is mounted a fiber input system 6 allowing the fibers to be input in two layers along the aforementioned guide planes P1 and P2. The fibers are for example routed towards the head via flexible tubes as described in application WO2006092514, each tube receiving a fiber into its inner channel. The input system then consists of an anchoring ramp 61 to which are anchored the end parts 62 of flexible tubes in staggered rows, in two rows. The ramp is for example fitted onto two rods 271 integral with the module 2 and is held in place by butterfly screws 272 screwed onto said rods. In the embodiment shown, the head is provided for the placement of a strip of 32 fibers from two layers of 16 fibers.

Figure 6:
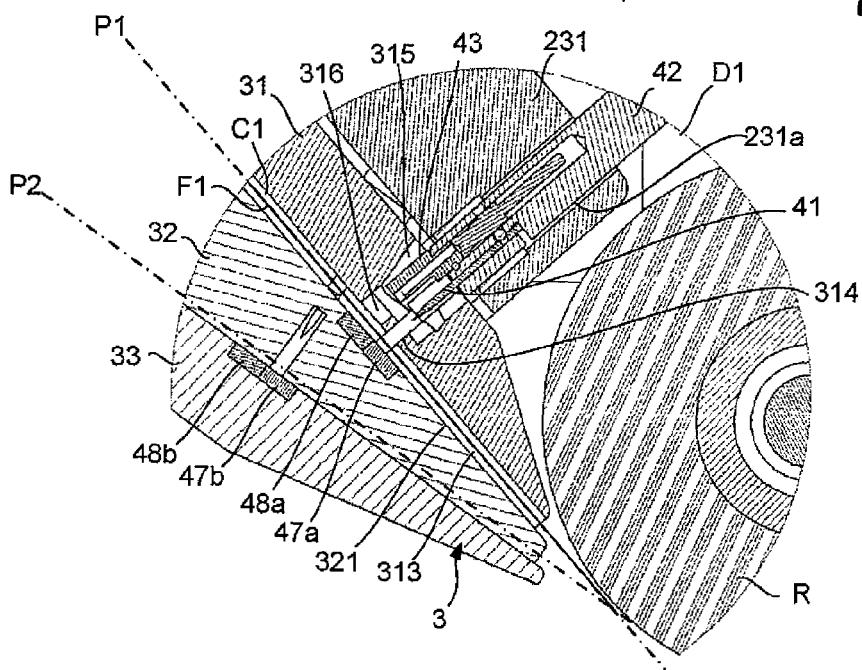
FIG. 6 is an enlarged view of the detail D1 in FIG. 5.

The guide system 3 includes three, preferably metal, plates, mounted flat against each other on the module so as to define between them first guide channels and second guide channels in which pass the fibers of the first layer and of the second layer respectively so as to bring them tangentially to the application roller. With reference to FIGS. 5, 6 and 9 to 12, a first external plate 31 is mounted by a first main surface 311 against a first main surface 321 of a so-called central plate 32, and a second external plate 33 is mounted by a first main surface 331 against the second main surface 322 of the central plate. The central plate has a triangular transverse cross-section, the inclination between its two main surfaces 321, 322 corresponding to the angle between the two guide planes P1, P2. The first guide channels C1 (FIG. 6) are constituted by longitudinal grooves 313 provided on the first main surface 311 of the first external plate, and enclosed by the first main surface 321 of the central plate. These grooves have a width that corresponds substantially to the width of the flat fibers and are spaced out transversely from each other by a distance corresponding substantially to the width of a groove. The second guide channels C2 (FIG. 10) are formed by longitudinal grooves 323 provided on the second main surface 322 of the central plate, and enclosed by the first main surface 331 of the second external plate. These grooves 323 are similar to those of the first plate and offset transversely by one groove width relative to the latter, such that the first and second channels are placed in staggered rows and that the fibers F1 and F2 of the two layers are placed substantially edge to edge on the application roller in order to form the application strip. As shown in FIGS. 6 and 10, the intersection between the two guide planes P1 and P2 is located downstream from the guide system, at roller level.

Figure 11:
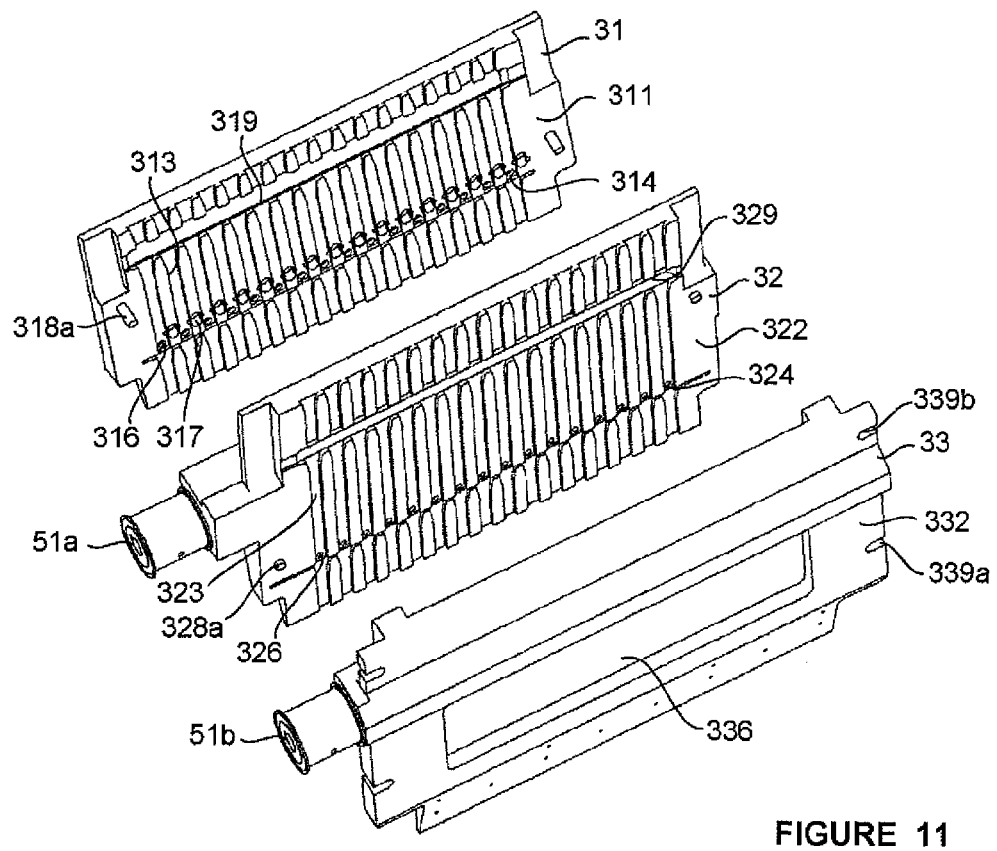
FIGS. 11 and 12 are two exploded perspective views of the three plates constituting the guide system.
Figure 12:
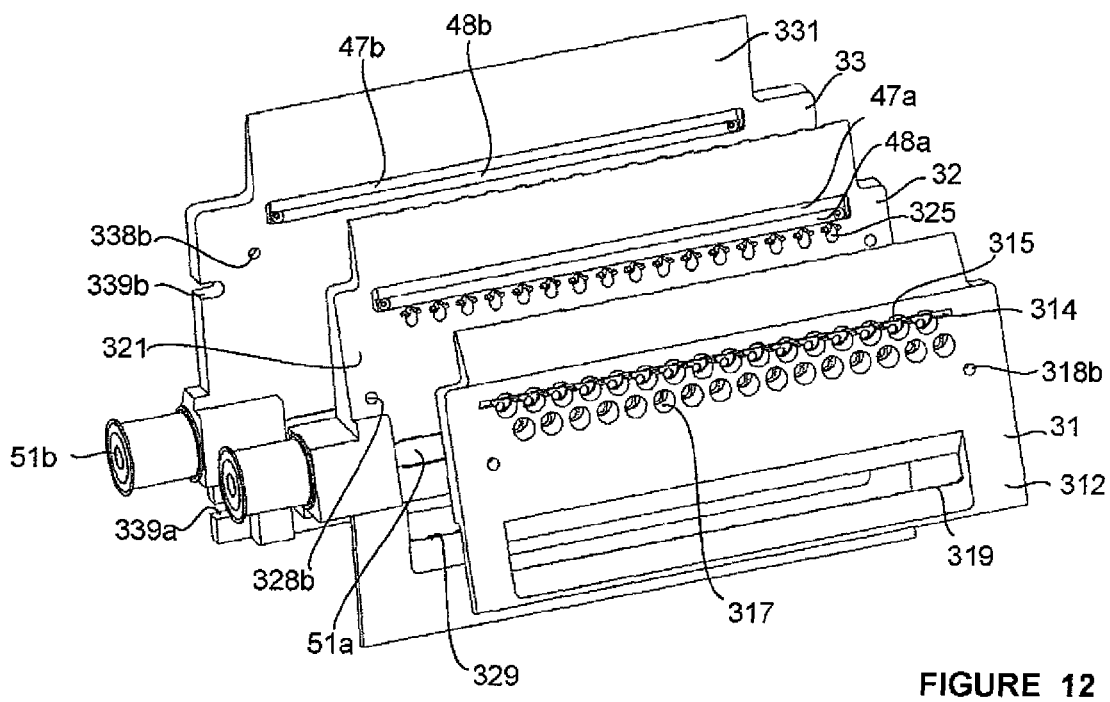
Figure 13:
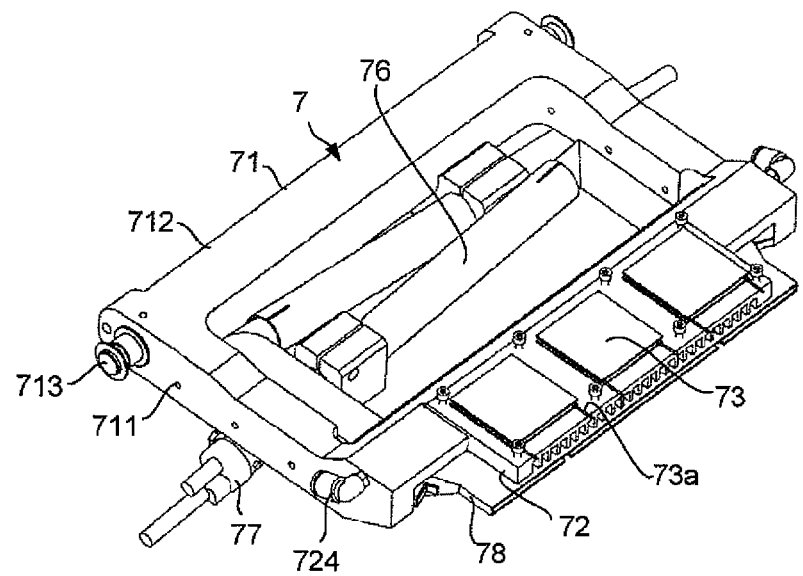
FIG. 13 is a perspective view of the heat regulation system, in the absence of the protective plate of the cooling modules.
Figure 14:
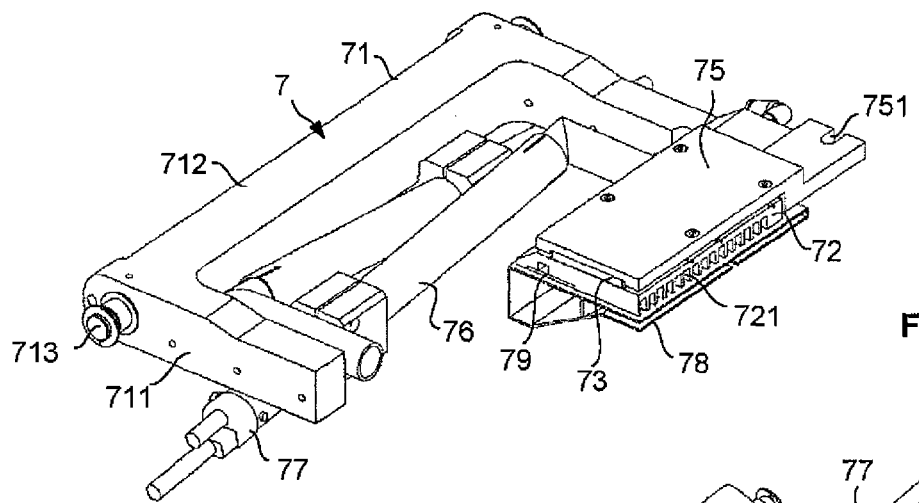
FIG. 14 is a partial perspective view of the heat regulation system.
Figure 15:
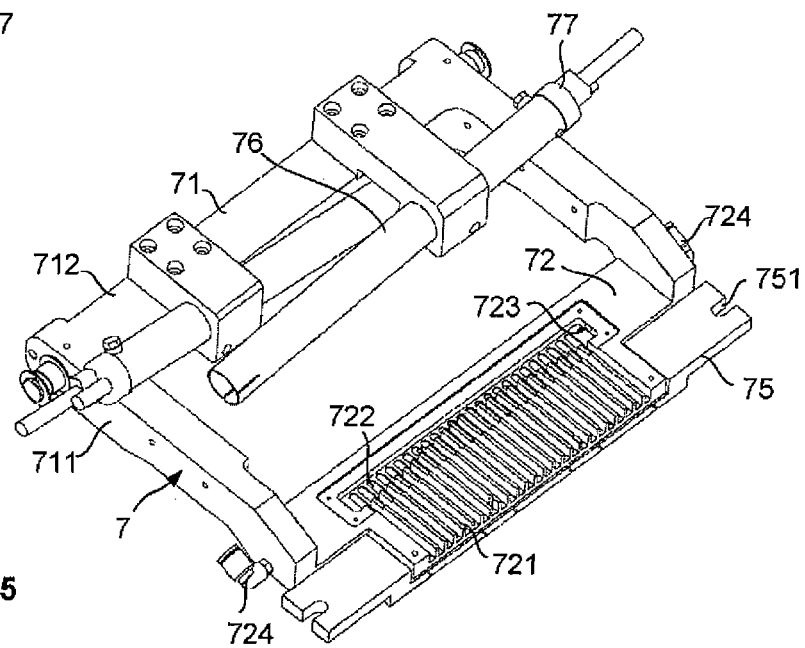
FIG. 15 is another perspective view of the regulation system in the absence of the hot air blowing spout.

According to FIGS. 4, 11 and 12, the three plates are mounted on the front edges of the flanges, upstream of the roller relative to the direction of displacement of the head in use, by means of threaded upper 281 and lower 282 rods mounted to swivel on the flanges and coming to insert themselves into lateral upper 339a and lower 339b notches in the second external plate 33, the latter being of more significant width than the two other plates 31, 32. Nuts 283 are screwed onto the end of the rods to bear against the second external plate and to hold the plates tightly one against the other, the first plate bearing via its second main surface against a first cross-piece 231. To ensure that the plates are centered, the first external plate and the central plate have centering studs 318a, 328a which insert themselves respectively into complimentary recesses 328b, 338b in the central plate and the second external plate. The first plate also includes recesses 318b intended to receive complimentary studs of the first cross-piece.

The module includes a cutting and blocking system for each fiber, each system including a plane blade and a blocking stud mounted at the end of the rod of a pneumatic jack, and a cutting counter tool and a blocking counter tool placed facing the blade and blocking stud respectively.

Figure 7:
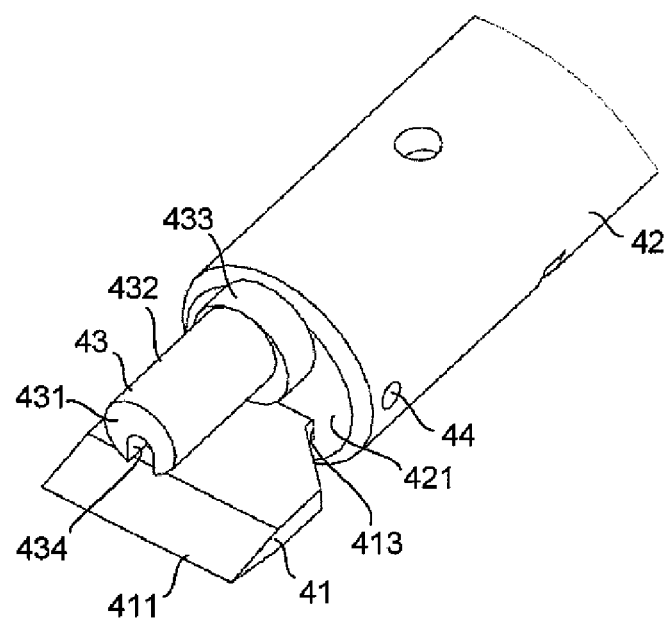
FIG. 7 is a partial perspective view of a fiber cutting system showing the blocking stud and the cutting blade at the end of the rod of an activation jack.
Figure 8:
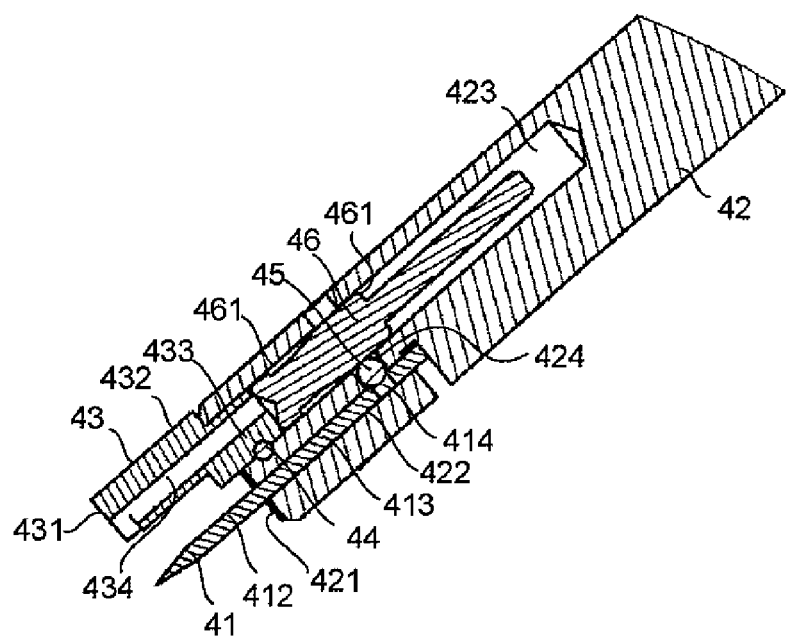
FIG. 8 is a partial longitudinal cross-section of the rod of a cutting jack.

With reference to FIGS. 5, 7 and 8, for each cutting and blocking system, the plane blade 41 is mounted fixed to the end of the cylindrical rod 42 of the jack 40, and has a bevelled cutting edge 411 placed perpendicularly to the jack rod. The width of the cutting edge is slightly greater than the width of a guide channel C1, C2, in order to guarantee that a fiber is cut completely. The blade includes a wide distal part 412 which is fitted with a cutting edge and which is extended by a narrower proximal assembly part 413, by which the blade is mounted into a first longitudinal housing 422 of rectangular cross-section provided on the end plane surface 421 of the rod. The stud has a cylindrical distal part 432, defining a plane support surface 431 perpendicular to the jack rod, and extending by a proximal assembly portion or cylindrical base plate 433. The stud is anchored by its base plate in a second cylindrical housing 423 of the end surface 421. The two housings are placed in parallel and on either side of the axis of the rod. The cutting edge 411 of the blade is placed so as to project slightly relative to the support surface 431 of the blocking stud.

The stud is assembled on the rod using a cotter pin 44 inserted into a transverse bore in the rod, and passing into a peripheral recess in the base plate 433 so as to block the stud.

The blade is assembled on the rod using a blocking ball 45 placed in a transverse bore 424 connecting the two housings 422, 423. The ball has a diameter greater than the length of the bore and is able to be engaged partially in an aperture 414 in the proximal part of the blade in order to block it.

A pin 46 is mounted to slide in the second housing between the bottom of the housing and the base plate of the stud and is acted upon resiliently in a so-called blocking position against the base plate of the stud by resilient means, for example a compression spring (not shown) mounted between the bottom of the housing and an annular shoulder 462 of the pin. The pin has an external diameter corresponding substantially to the diameter of the second housing, and its diameter gradually narrows in the direction of its distal end in order to form an annular groove 461 in which the ball can be partially received. The stud has a longitudinal channel 434 extending over its entire length so that a tool, such as a metal point, can be inserted into it in order to move the pin against the spring. In its blocked position shown in FIG. 6, the pin keeps the ball in the aperture of the blade in order to block it. To withdraw a blade, the pin is displaced inside the housing by inserting a tool into the channel 434, until the pin is brought to bear by its proximal end against the bottom of the housing. In this so-called unblocked position, the pin groove is positioned facing the ball. When traction is exerted on the blade, the ball is displaced towards the groove thereby emerging from the aperture 414 in order to unblock the blade. The pin will also be brought into the unblocked position when a blade is assembled.

First and second cutting and blocking systems, referenced as 4A and 4B respectively, are intended for cutting and blocking the first layer of fibers and the second layer of fibers respectively.

With reference to FIGS. 5, 6, 11 and 12, the jacks 40 of the first cutting and blocking systems 4A are anchored by their body 40a to a second cross-piece 232 along a first transverse row 231. The rods 41 of the jacks pass through the first cross-piece, each rod being guided in a bore 231a in this first cross-piece. The first plate in the guide system includes a transverse slot 314, passing right through the plate and placed perpendicularly to the grooves 313, so that the blades of all the first cutting and blocking systems can be passed through. The jacks are placed side-by-side such that the rods are centered along the first channels C1, substantially perpendicular to the first guide plane P1. The first plate additionally has on its second main surface a row of cylindrical recesses 315 for the jack rods to pass through, the bottom of each recess being passed through by the transverse slot 314 and being fitted with a circular hole 316 for the stud to pass through, said hole emerging on a groove 313 upstream of the slot 314 relative to the direction of displacement of the fibers.

The cutting counter tools of these first cutting and blocking systems 4A are formed here of an elastomer transverse bar 47a housed in a recess in the first main surface 321 of the central plate. The blocking counter tools of these first systems 4A are formed of one and the same metal bar 48a housed in the same recess as the elastomer bar, parallel to and upstream thereof. The two bars are substantially flush with the first main surface 321 depending on the thickness of the fibers.

The jack of the first cutting and blocking system is able to displace its blade and its stud from a rest position shown in FIG. 6, towards an active position in order to cut and block a fiber. In the rest position, the blade and the stud are placed in a recess 315, the cutting edge 311 of the blade and the support surface 431 of the stud being separated from the guide channel C1. When it is displaced towards the active position, the jack rod goes back into the recess 315, the blade passes through the slot 314 and the stud passes through the hole 316 in the recess. The blade slightly longer than the blocking stud is stopped against the elastomer bar 47a and cuts the fiber, then the stud is stopped by its support surface against the metal bar 48a and pinches the fiber upstream of the blade.

Figure 9:
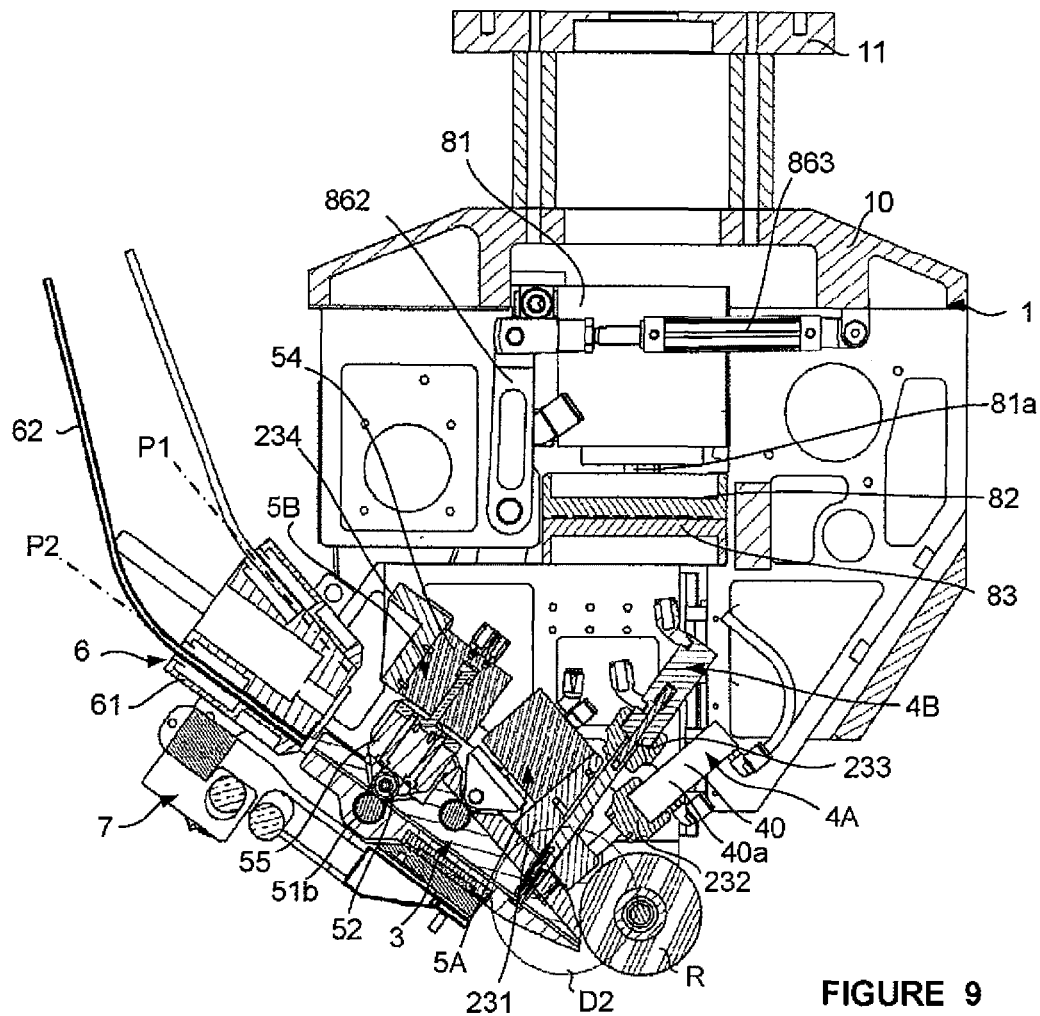
FIG. 9 is a cross-section view of the head along the plane IX-IX in FIG. 3, showing the guide path for a fiber of the second layer.
Figure 10:
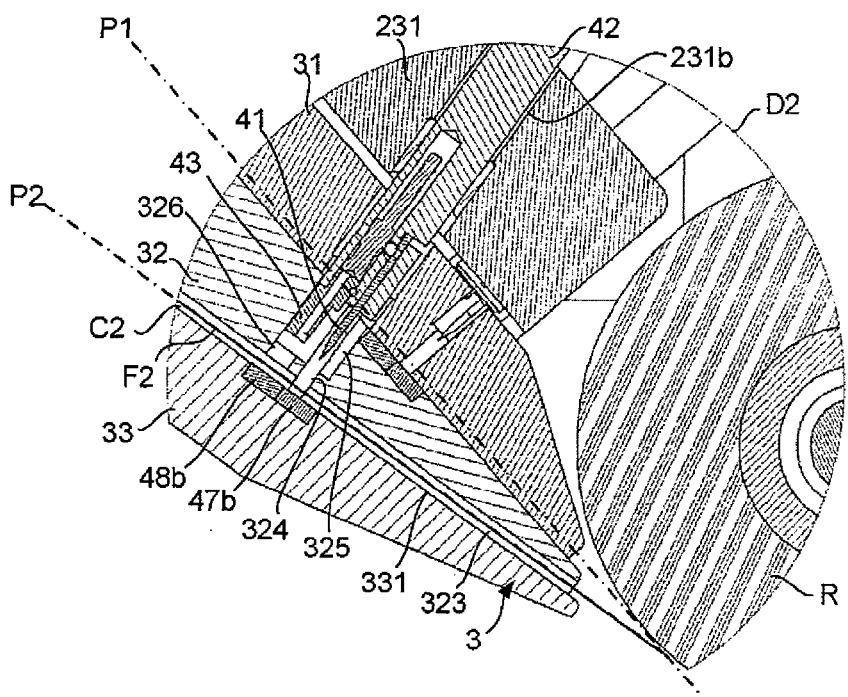
FIG. 10 is an enlarged view of the detail D2 in FIG. 9.

With reference to FIGS. 9 and 10, the jacks of the second cutting and blocking systems 4B are anchored by their body to a third cross-piece 233, in accordance with a second transverse row arranged over the first row of jacks in the first system 4A. The jack rods pass through a bore 231b in the first cross-piece 231, the first plate 31 and the central plate 32, such that their blade and their stud are able to cut and block the fibers of the second layer perpendicularly in the second channels C2.

The first plate 31 in the guide system includes a transverse row of through holes 317 arranged in staggered rows relative to the recesses 315, and upstream of the latter relative to the direction of forward movement of the fibers. These holes emerge on the second main surface between the grooves 313. The second plate has on its first main surface 321 a transverse row of cylindrical recesses 325, placed upstream of the cutting and blocking counter tools 47a, 48a. When the plates are assembled, the recesses 325 and the holes 317 are aligned and their axes are placed perpendicularly to the second main surface 322 of the central plate. The bottom of these recesses 325 is fitted with a through hole 326 for a blocking stud to pass through, each hole emerging in a groove 323. A longitudinal slot 324 is provided from the second main surface of the central plate for the blades to pass through, this slot partially emerging on the first main surface of the central plate. The cutting and blocking counter tools are formed as previously by a transverse elastomer bar 47b and a metal bar 48b housed this time in a recess in the first main surface of the central plate. The jacks of these second cutting and blocking systems 4B are anchored such that, in the rest position of the jacks, the rods extend into the holes 317 with the studs and blades in the recesses 325. When it is displaced towards the active position, the rod goes back into the recess 325, the blade passes through the slot 324 and the stud through the hole 326. The blade slightly longer than the blocking stud bears against the elastomer bar and cuts the fiber, then the fiber upstream of the blade is pinched between the stud and the metal bar.

This arrangement of the first and second cutting and blocking systems, with the jacks for the second layer of fibers furthest away from the roller which are arranged above the jacks for the first layer, allows the fibers to be cut and blocked as close as possible to the roller, while reducing to a minimum the gap between the rerouting distance of a fiber of the first layer and that of a fiber of the second layer.

The module includes first rerouting systems 5A for rerouting fibers of the first layer. According to FIG. 5, these first systems include a drive roller 51a and kicking rollers 52 at the ends of the pneumatic jack rods 54. The jacks are assembled by their body in a row on the first cross-piece 231 such that the kicking rollers are placed upstream of the cutting and blocking systems 4A, 4B, in a transverse aperture 319 (FIGS. 11 and 12) passing through the first plate, each kicking roller being centered along a first channel C1. The drive roller 51a is mounted to rotate in a transverse bore of the central plate 32. This bore emerges on the first main surface 321 facing the aperture 319 and the roller is placed in the bore tangentially to said main surface. Each jack 54 may be controlled individually between a rest position, in which its kicking roller is withdrawn relative to the guide channel C1, and an active position in which the kicking roller acts to flatten the fiber against the drive roller in order to push the fiber forward.

Similarly, the second rerouting systems include jacks assembled by their body in a row on a fourth cross-piece 234 upstream of the first rerouting systems 5A with their kicking rollers placed in a transverse aperture 329 passing through the central plate, each kicking roller being centered along a second channel C2. The first external plate is shorter in length than the other two plates and said aperture 328 is provided in a part of the central plate, of reduced thickness, placed upstream of the first external plate. As can be seen in FIG. 5, the support systems 55 of the kicking rollers on the jack rod have notches 55a laterally to allow the fibers of the first layer to pass through. A roller 51b is mounted to rotate in a transverse bore of the second external plate 33, tangentially to said main surface.

According to FIGS. 4 and 5, the two drive rollers are rotated using a belt 84 by a single motor 85 mounted on the deck 10. To allow ease of assembly of the module, the tension of the belt 84 is controlled by a belt tension system comprising a pulley 861 mounted at the end of a swivel arm 862 activated by a jack 863.

The jacks for activating the cutting and guide systems and the rerouting systems are connected to pneumatic directional control valves 87 mounted on the deck and servo-controlled by a head control unit. This connection is achieved automatically by means of two connection plates 82, 83 when the module is assembled on the deck by quick-action locking systems 25. All the activation jacks are connected using pipes (not shown) to the lower openings of the ducts of the second connection plate 83, whereas the directional control valve outputs are connected by pipes to the upper openings of the ducts of the first connection plate 82. O-rings in the lower apertures of the conduits of the first connection plate will guarantee that the connections are sealed.

With reference to FIGS. 4 and 13 to 15, the head additionally includes a heat regulation system 7 comprising cooling means, such as Peltier effect thermoelectric modules, in order to cool the guide system 4, and heating means in order to heat the fibers as they leave the guide system and/or the processing mold upstream of the roller.

The regulation system includes a U-shaped support 71 the two branches 711 of which are connected at the end by a support plate 72 on which are mounted Peltier effect thermoelectric modules 73, for example three in number. The U-shaped support is fitted at its base 712 with two axes 713 so that it can be mounted to swivel by means of two arms 74 on the ramp of the input system 6, such that the cold ceramic plates of the modules are placed facing the second external plate 33, as shown in particular in FIG. 5. The outputs 73a of the modules will be connected to an electrical circuit, and the modules are covered with a protective plate 75 which is housed in a recess 336 of the second main surface 332 of the second external plate. The modules cool the metal plates, and the drive rollers 51a, 51b incorporated in the central plate and the external plate. The threaded lower rods 282 are to advantage received in lateral notches 751 in the protective plate and the nuts 283 are screwed onto these rods so as to bear against the protective plate, thereby holding the protective plate tightly against the guide system. The heating means include two ducts 76 mounted on the support, fitted with a heating system 77, and intended to be connected to a compressed air source. The two ducts supply a hot air blowing nozzle 78 placed against the support plate 72, on the opposite side from the Peltier effect modules. When the support bears against the guide system, the nozzle directs the hot air flow towards the roller.

The support plate acts to advantage as a heat sink in order to dissipate the heat from the hot ceramic plates. The support plate has on its surface opposite to the modules a plurality of parallel grooves 721 emerging on its front edge and connected to each other by a transverse groove 722. These grooves 271, 272 are closed using an intermediate plate 79, and the transverse groove is supplied at the end with fresh air through transverse channels 723 intended to be connected using connectors 724 to a compressed air source.

The module 2 integrates all the elements of the head that come into contact with the fibers. The module can easily be dismantled for cleaning purposes, without touching the pneumatic connections of the jacks, after simply disengaging the belt from the drive rollers, and possibly removing the fiber input and heat regulation systems, should the case arise where the head needs to be used with another clean module. The plates in the guide system can be withdrawn one by one so that all the surfaces in contact with the fibers and the rollers can be cleaned and possibly the counter tools can be changed. After withdrawing the plates, the kicking rollers, the studs and the blades are easily accessible and can easily be cleaned. The blades may furthermore easily be changed as described previously.

Although the invention has been described in conjunction with one particular embodiment, it is quite obvious that it is no way restricted thereto and that it includes all the technical equivalents of the means described and the combinations thereof if the latter fall within the framework of the invention.

The invention claimed is:

1. A fiber application head, intended to be mounted at an end of a displacement system in order to apply to a surface a wide strip formed of a number of fibers, comprising:
   an application roller for applying the fibers in the form of a strip;
   means for guiding fibers on said roller;

cutting means adapted to cut the fibers upstream of the application roller, said cutting means including blades activated by activation systems between a rest position and an active cutting position; and rerouting means placed upstream of the cutting means, said rerouting means including kicking rollers activated by activation systems between a rest position and an active position so as to flatten the fibers against at least one drive roller, the kicking rollers and their associated activation systems being placed on the side of the roller relative to the fibers, wherein said blades and associated activation systems are all placed on the side of the roller relative to said fibers, such that the blades are placed facing the surface of the fibers coming against the roller, and wherein the guide means include first and second guide means arranged in staggered rows along two guide planes that grow closer to each other from upstream to downstream in order to guide the fibers towards the roller in the form of two layers of fibers, and in that the and wherein the cutting means include first and second cutting means, the blades of the first cutting means being able to cut individually the fibers of the first layer guided by the first guide means, and the blades of the second cutting means being able to cut individually the fibers of the second layer guided by the second guide means while passing between the first guide means.

2. The fiber application head according to claim 1, wherein the blades of the first cutting means and the blades of the second cutting means are arranged in staggered rows along two planes inclined one relative to the other by an angle substantially equal to the angle between the two guide planes, the second cutting means being placed over the first cutting means relative to the roller.

3. The fiber application head according to claim 1, wherein the guide means include first channels and second channels, said first channels are formed at a first assembly interface between a first external plate and a central plate, and said second channels are formed at a second assembly interface between said central plate and a second external plate, the blades of the first cutting means passing through the first external plate, and the blades of the second cutting means passing through the first external plate and the central plate.

4. The fiber application head according to claim 3, wherein the cutting means include counter tools arranged perpendicularly to the guide channels, facing the cutting edges of the blades, and against which the blades are stopped in the cutting position.

5. The fiber application head according to claim 1, wherein the rerouting means include first rerouting means comprising a first drive roller, mounted on the central plate, perpendicularly and tangentially to the first guide channels, and kicking rollers activated by activation systems between a rest position and an active position so as to flatten the fibers of the first layer individually against said first drive roller, and second rerouting means placed upstream of the first rerouting means, comprising a second drive roller, mounted on the second external plate, perpendicularly and tangentially to the second guide channels, and kicking rollers activated between a rest position and an active position by activation systems extending between the fibers of the first layer so as to flatten the fibers of the second layer individually against said second drive roller.

6. The fiber application head according to claim 1, further comprising a support deck by which said head is intended to be joined to a displacement system, said cutting means, said guide means and said application roller form a module, said module adapted to be joined by quick-action locking means to an end of a rod of at least one compaction jack mounted on said support deck.

7. The fiber application head according to claim 3, further comprising a heat regulation system including cooling means able to cool the second external plate so as to cool by conduction all the guide plates.

8. The fiber application head according to claim 1, wherein the cutting means include a jack type activation system for each blade.

9. The fiber application head according to claim 1, further comprising blocking means placed upstream of the cutting means, on the side of the application roller, adapted to block the fibers that have just been cut, said blocking means including blocking studs activated by activation systems between a rest position and an active blocking position, said blocking studs and said blades being activated between the rest position and the active position by common activation systems, said activation systems adapted, for each fiber to be cut and to be blocked, to displace a blade and a blocking stud in order to cut and block the fiber.

10. The fiber application head according to claim 9, wherein said activation systems include a jack for each fiber, carrying at an end of a rod of the jack, a stud and a plane blade for cutting and blocking a fiber individually.

11. The fiber application head according to claim 3, further comprising blocking means placed upstream of the cutting means, on the side of the application roller, adapted to block the fibers that have just been cut, said blocking means including blocking studs activated by activation systems between a rest position and an active blocking position, said blocking studs and said blades being activated between the rest position and the active position by common activation systems, said activation systems adapted, for each fiber to be cut and to be blocked, to displace a blade and a blocking stud in order to cut and block the fiber.

12. The fiber application head according to claim 11, wherein said activation systems include a jack for each fiber, carrying at an end of a rod of the jack, a stud and a plane blade for cutting and blocking a fiber individually.

13. The fiber application head according to claim 12, wherein the blocking means include blocking counter tools placed facing support surfaces of the studs and against which the studs are stopped in the active blocking position, said counter tools including two rigid bars housed in a housing in the central plate and in a housing in the second external plate respectively, perpendicularly to the guide channels.

14. The fiber application head according to claim 4, wherein the counter tools of the first cutting means being formed by a bar of an elastomer material housed in a housing in the central plate, and the counter tools of the second cutting means being formed by a bar of an elastomer material housed in a housing in the second external plate.

15. The fiber application head according to claim 10, wherein the blade is mounted by a proximal part of the blade in a first longitudinal housing in the jack rod, the rod being fitted with a blade blocking system including an activation pin mounted to slide in a second longitudinal housing in the rode and a blocking ball mounted in a transverse bore connecting the two housings, said activation pin being acted upon resiliently by resilient means in a rest position in which said pin holds said blocking ball at least partially engaged in the first housing so as to block the blade axially, and adapted to be displaced from the outside by means of a tool to an unblocked position in which the ball is adapted to engage partially in the second housing in order to unblock the blade.

16. The fiber application head according to claim 15, wherein the blocking stud is mounted by a proximal part of the blocking stud in the second housing, said stud including a longitudinal channel allowing the pin mounted between the stud and a bottom of the housing to be displaced by means of a tool inserted into said channel.

* * * * *

UNITED STATES PATENT AND TRADEMARK OFFICE
CERTIFICATE OF CORRECTION

PATENT NO. : 7,926,537 B2  
APPLICATION NO. : 11/740064  
DATED : April 19, 2011  
INVENTOR(S) : Hamlyn et al.

Page 1 of 1

It is certified that error appears in the above-identified patent and that said Letters Patent is hereby corrected as shown below:

Title page, item (73):  
After "Assignee" delete "Lyons" and insert -- Lyon --.

Column 11, line 20:  
Delete "and in that the".

Column 12, line 59:  
Delete "rode" and insert -- rod --.

Signed and Sealed this  
Twenty-fourth Day of January, 2012

David J. Kappos  
*Director of the United States Patent and Trademark Office*